US007938928B2

(12) United States Patent
Torres Candela

(10) Patent No.: US 7,938,928 B2
(45) Date of Patent: May 10, 2011

(54) METHOD AND DEVICE FOR THE REPRODUCTION OF IMAGES USING GLASS PIXELS

(75) Inventor: Luis Torres Candela, Elche (ES)

(73) Assignee: Alzaba, S.L., Elche (ES)

( * ) Notice: Subject to any disclaimer, the term of this patent is extended or adjusted under 35 U.S.C. 154(b) by 948 days.

(21) Appl. No.: 11/568,782

(22) PCT Filed: Apr. 18, 2005

(86) PCT No.: PCT/ES2005/000199
§ 371 (c)(1),
(2), (4) Date: Jul. 6, 2007

(87) PCT Pub. No.: WO2005/108115
PCT Pub. Date: Nov. 17, 2005

(65) Prior Publication Data

US 2008/0115053 A1 May 15, 2008

(30) Foreign Application Priority Data

May 7, 2004 (ES) .................................. 200401100

(51) Int. Cl.
*B32B 37/00* (2006.01)
*B29C 65/00* (2006.01)

(52) U.S. Cl. .......... 156/297; 156/63; 156/399; 156/560; 221/92

(58) Field of Classification Search .................... 156/63, 156/297, 299, 362, 560, 561, 562, 58, 59, 156/64, 363, 539; 221/92, 124, 131
See application file for complete search history.

(56) References Cited

U.S. PATENT DOCUMENTS

| | | | |
|---|---|---|---|
| 5,913,992 | A | 6/1999 | Gerber |
| 6,003,577 | A | 12/1999 | Morito |

FOREIGN PATENT DOCUMENTS

| | | | |
|---|---|---|---|
| FR | 2 676 300 | A1 | 11/1992 |
| FR | 2 733 940 | A1 | 11/1996 |

OTHER PUBLICATIONS

Machine translation of FR 2676300 Nov. 13, 1992.*

* cited by examiner

*Primary Examiner* — John L Goff, II
(74) *Attorney, Agent, or Firm* — Peter B. Scull; K. Kalan; Berenbaum Weinshienk PC

(57) ABSTRACT

A method and device are described for the reproduction of a certain image, previously digitalized and separated into a number of pixels and optimized into a number of colors below a certain limit, with the help of a specific software application. The method includes the construction of individual colored elements that correspond to each of the colors selected for the image, where these elements or pixels consist of small cubic parts made of glass or similar. The method and the device include the means for extracting said pixels from the individual containers and positioning them sequentially for the formation of successive rows which, placed next to each other, form the desired image. The desired image or mosaic is completed with the support for the pixels made of an appropriate material, where the pixels are bound to each other and/or to the support by means of a process of adhesion or the application of heat in an oven up to the temperature at which the material softens.

11 Claims, 1 Drawing Sheet

METHOD AND DEVICE FOR THE REPRODUCTION OF IMAGES USING GLASS PIXELS

CROSS-REFERENCE TO RELATED APPLICATIONS

The present application is the US national stage application of the Patent Cooperation Treaty (PCT) Application Number PCT/ES2005/000199, filed 18 Apr. 2005, entitled "METHOD AND DEVICE FOR THE REPRODUCTION OF IMAGES USING GLASS PIXELS"; which designated all states including the United States of America; the subject matter of which hereby being specifically incorporated herein by reference for all that it discloses and teaches; and claims priority from the Spanish Patent Application, Number P200401100, filed 7 May 2004, the subject matter of which also hereby being specifically incorporated herein by reference for all that it discloses and teaches.

FIELD OF THE INVENTION

This invention relates to a method and device for the reproduction of images through glass pixels, which provide essential characteristics of novelty and notable advantages over known means and processes used for the same purposes in the current state of the art.

In particular, the invention proposes the development of a method and device through which it is possible to reproduce an image obtained from a photograph or other of whatsoever kind with the use of numerous individual elements or pixels, made of glass and in a predetermined number of different colors which, appropriately combined, make it possible for the reproduction obtained to give a true base image. The process includes the preliminary training of a database based on the original image, whereas the device includes a number of hoppers or individual containers, as many as the colors that have been selected for the manufacture of the pixels, so that each container or hopper contains a specific quantity of pixels of the color assigned thereto. The supply of the pixels from each container is controlled and activated by computer through specifically designed software.

The field of application of the invention is situated in the industrial sector devoted to the creation of mosaics or similar with the intervention of computer-controlled mechanisms that use specific programs.

BACKGROUND AND DESCRIPTION OF THE INVENTION

In practice, there are various techniques for the reproduction of images. At present, these techniques are also computer-assisted, for which purpose specific programs are designed to enable a true and exact reproduction of the desired image for implementation on a previously selected flat support at the desired size.

As is known, any figure presented on any graphic medium comprises a number of adjacent points of different colors which, when observed from a certain distance, reproduce the image being represented. When these images are reproduced digitally, each point is called a pixel.

Taking into account these considerations, the objective pursued by this invention has been that of composing an image that is a true reproduction of whatsoever other image through the appropriate ordering of a set of small individual parts of an appropriate material (for example, glass, ceramic, plastic, etc., with a preference for glass), each of which will constitute the equivalent of one pixel in the final reproduction, where said parts or pixels are adhered to a predetermined flat support for the formation on said support of a mosaic that reproduces the initially selected image. This mosaic could be used as a decorative element on a mural, ceiling or floor, constituting a resistant and highly durable element, depending on the material used.

The existence of an apparatus and method for the creation of an image mounted on the basis of glass beads is known through patent document U.S. Pat. No. 6,003,577, where a number of beads of different colors are used and each bead comprises a small perfectly spherical ball of glass. The colored beads are selected in accordance with a predetermined sequence for their ordered feeding on to a flat support that is also made of glass, so that once the composition of the image has been completed, the unit formed by the glass beads and the glass support must be subjected to heating to reach the temperature at which glass melts so that the beads are melted directly onto the support to ensure their fixing to the latter. Although the method and device proposed by this document provide a reproduction that evidently corresponds to the originally selected image, it is also true that the image is imperfect given the fact that the spherical shape of the beads does not completely fill the spaces between the beads unless the unit is subsequently subjected to very high temperatures so that, by completely melting the glass, said empty spaces are filled. The device proposed is designed, according to the first implementation, on the basis of a number of pipes for the storage of the colored glass beads, from where they are sent to a common head that deposits them successively on the glass support.

As mentioned previously, a method and device of the type described in the aforementioned patent document are complex and costly to put into practice, and the result obtained shows the observer the imperfections inherent to the spherical form adopted by the glass beads. In addition, it requires the application of very complex fixing methods during the development of the process in order to prevent the spherical beads from rolling and losing their position.

Therefore, one object of this invention consists of the development of a method by which it is possible to reproduce an image on a certain support in such a way that said reproduction corresponds correctly to the original and is also exempt from imperfections of the above-mentioned type.

Another object of this invention consists of the provision of a device for the implementation of the method.

These objects have been completely fulfilled through the method and device described below in greater detail and whose main characteristics constitute the characterizing parts of claims 1 and 8 below, respectively.

In accordance with the invention, the process that is to be described enables the creation of large mosaics with the use of very small individual pieces (or pixels) that create an exact reproduction of the image obtained, for example, from whatsoever photograph that has been previously subjected to a modification process to adapt its colors to those that are to be used.

The process can be carried out with any of the above-mentioned materials, although some are more appropriate than others due to their quality, durability and resistance to atmospheric agents, where, accordingly, glass-based material is particularly preferred as it meets the most appropriate conditions and this shall be the material referred to in the following description, albeit merely for the purposes of explanation and not limiting thereto under any circumstances, since, as already mentioned, the process can be carried out in exactly the same way with any other material that can be shaped into small parts with the appropriate color and shape.

As expected, to compose the selected image, there must be a sufficient number of small glass parts of each of the selected colors. The configuration selected for one of the individual parts or pixels is the public format or, at least, a form such that one of the faces has the shape of a square. In this way, the use of space is optimized and the separations between the parts are eliminated substantially.

The choice of the cubic configuration has a certain effect on certain mechanisms involved in the process, since it is not the same to handle the part regardless of its position (as occurs in the case of the cubic parts) than having to place it in a certain position beforehand, which would involve the need for additional devices for positioning the part.

In addition, the use of cubic pixels or parts makes it possible to fill more space with color, whereas, with circular designs or other similar shapes, the successive joints between one and the other leave spaces that can be seen, depending on the distance. Consequently, the cubic shape is unquestionably the most appropriate for obtaining a greater sensation of continuity in the image reproduced. Therefore, the following description assumes that the parts used in the method and the device corresponding to this invention are cubic in shape; however, it must be pointed out that the indications of the process could also be valid for other shapes and, of course, for parts of other sizes, as long as they are all the same, assuming that the purpose is to use the smallest size possible since the smaller pixels, the higher the definition of the image or the smaller it will be.

However, for the sake of explanation, practical limitations recommend paying attention to certain size-related considerations. Let us suppose, therefore, that the aim is to reproduce a photograph comprising 41,400 pixels distributed in 180 columns by 230 rows.

At its original size (without enlargement or reduction), the image, seen on the monitor of a normal computer, which uses dots of an approximate size of 3/10 of a millimeter, will occupy a space with an approximate width of 6 cm and an approximate height of 7 cm.

If, in the process proposed by the invention, parts with a side of 5 mm are used for the reproduction of the image, the final result would be an image with a width of 90 cm and a height of 115 cm. However, although the definition (number of pixels) is the same as the original image, to have the same optical sensation offered by the computer monitor, it would have to be observed from a distance that is 16 times greater.

Therefore, it is a question of using parts that are as small as possible (it could even be possible to work with parts measuring 1 mm) unless the final product is to be used for a large mural which necessarily has to be observed from a large distance, in which case, the use of 1 cm parts or greater could even be more appropriate and cheaper.

The size of the parts conditions that of many of the elements that make up the mechanisms in the device for the implementation of the process. Some of said elements may be adjustable and others must be built with different dimensions, depending on the size of the parts that are to be processed.

Consequently, for the processes that are reproduced, the basis has been the case of cubic parts with sides measuring 5 mm, as this is a dimension which, in principle, is considered appropriate for the purposes of the invention.

In addition, it is also necessary to establish certain considerations with regard to the colors of the parts or pixels that are to be used in the method of the invention. Accordingly, when an image is reproduced on a computer by any commercial image-processing software, the operating system has a wide range of around 16,777,216 different colors (256 cubed).

It is obvious that if the idea were for the process of the invention to have that range of colors, there would first of all have to be a certain number of cubic glass parts of each of the 16,777,216 different colors, which would represent a serious problem, since no glass manufacturer would be able to supply them nor would it be possible to store them at a reasonable cost.

However, in practice, it is not necessary to resort to so many colors to obtain an image with sufficient quality, bearing in mind the final use to be given to the product.

In fact, with a range of between 16 and 50 different colors, it is possible to obtain an image of good quality. And, if the purpose is limited to reproducing images in different tones of one single color (grays or browns, etc.), a range of 16 tones gives truly spectacular results with a quality that is more than sufficient for the use initially intended.

Therefore and for the purposes of simplifying the explanation and offering a better understanding thereof, we shall suppose that a total of 16 different colors are to be used, although we must emphasize that this is only for the sake of example and is not limiting under any circumstances, since the process is applicable to any number of colors, limited only by the need for the availability of the raw material and consequently multiplying, in the device described below, the number of storage tanks, supply pipes, etc.

Summarizing, the above is an explanation of the characteristics of the shape, size and color of the base material and the implementation of the invention shall be explained under the supposition that opaque glass parts of 16 different colors are used with a cubic shape and size of around 10 mm.

BRIEF DESCRIPTION OF THE DRAWINGS

These and other characteristics and advantages of the invention shall be more clearly exhibited in the detailed description below, given for the sake of example only and not limiting under any circumstances with reference to the attached drawings, in which.

DESCRIPTION OF A PREFERRED EMBODIMENT

Figure 1:
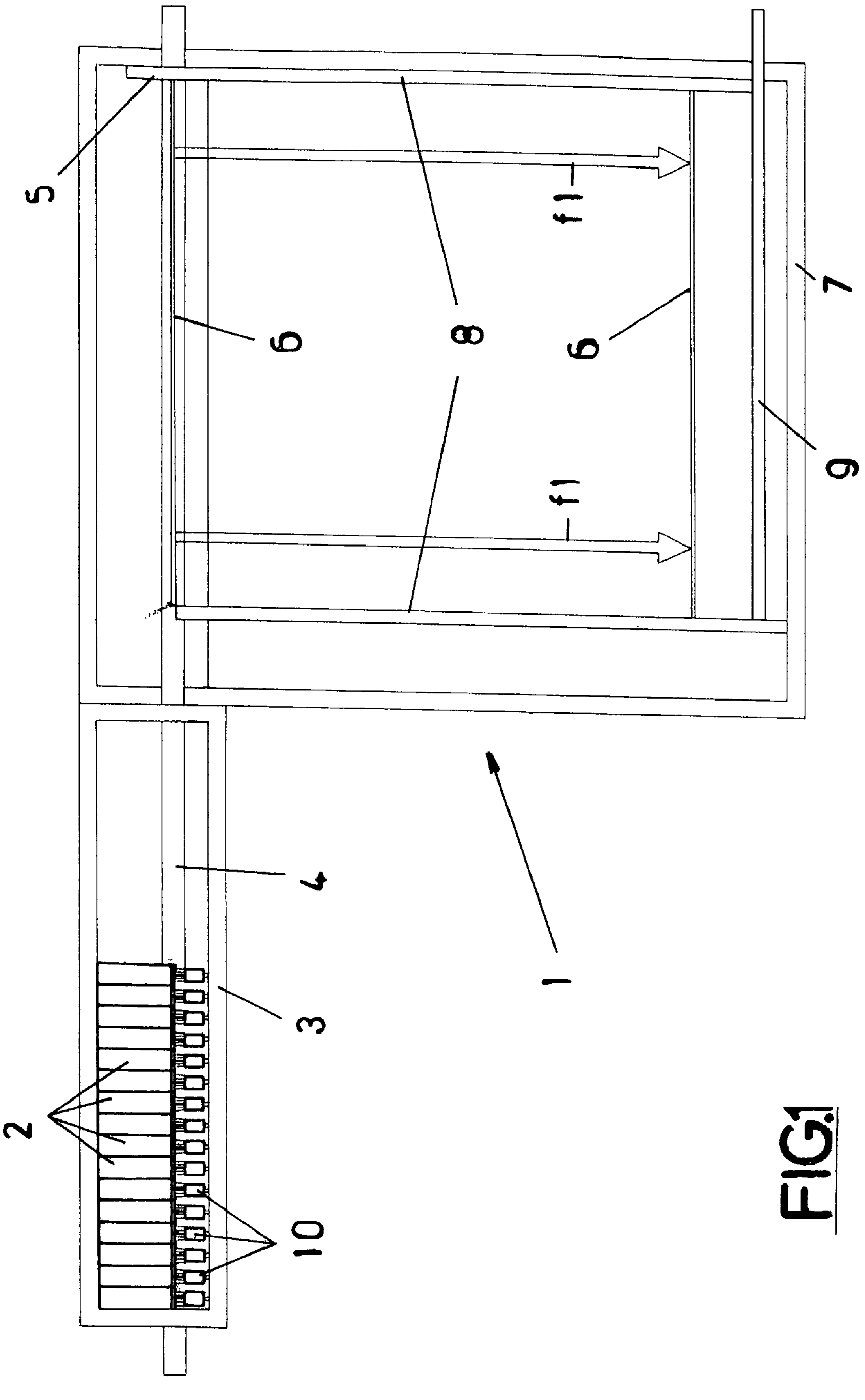
FIG. 1 shows a diagrammatic plan view of a device of the type proposed by the invention for the development of the claimed method.

As indicated above, the detailed description of the invention is to be given below with the help of the attached drawings. Accordingly, and for the implementation of the process, it is necessary to digitalize the image that is to be reproduced, an image which can be obtained from a physical object with the use of a digital camera or from any photograph with the use of scanning techniques or any other appropriate means.

Once the digitalized image is available, any of the many image-processing programs on the market can be used to cut, retouch and modify the image of the photograph so that it has the appropriate number of pixels and in order to optimize the number of colors in accordance with the desired quantity (in this example, 16), where these data are stored in one of the standard formats used by all commercial image-processing programs. The image shall be hereinafter called the 'base image'.

In short, this image is what shall be reproduced by the device corresponding to the invention, represented in general in FIG. 1, transforming it pixel by pixel into a mosaic of glass parts.

To carry out the method of the invention, the first part of the process is to prepare a database containing the information required for each of the pixels in the base image. For each pixel, this information consists of the position it occupies in the image (column number and row number) and the corresponding color code (a code that exactly identifies the color of the pixel in question). For this, a specifically developed software application is used.

This software application gathers all the aforementioned information pixel by pixel and stores it in a file that can be read later, ordered by rows and columns in the same order in which they have to be subsequently read.

Once these preliminary bases have been established, the subsequent development of the method uses the file generated in the previous step, and another specific computer program transmits the orders to the mechanical and/or electrical devices to carry out the required movements and operations sequentially in the order in which they have been prepared.

These orders are transmitted from the computer through a conventional interface of the type used in industrial computer-controlled automation processes. In this case, a header is used to which as many input and output modules as required are attached.

The instructions arrive from the computer through the output modules to the corresponding devices, causing the activation of certain elements associated with the mechanisms that feed the colored parts or pixels in accordance with the order in which they have to be supplied and the position they have to take up in the final reproduction.

In addition, the input modules capture and transmit to the computer, in reverse direction, the signals produced by the control elements (sensors) that provide information about events occurring during the process and which condition the behavior of the computer program and, therefore, the instructions issued by the computer.

In reference to the device proposed by the invention, represented diagrammatically in FIG. 1 of the attached drawings, generally designated by reference numeral 1, it is possible to see that it comprises a number of hoppers or containers 2 (which, in this example would total 16 containers, but which could be any other quantity), in which the pixels or small cubic glass parts are stored in such a way that each of the containers contains only the parts of one of the colors.

The containers 2 can be made of any material and be of any size, although, preferentially, they shall be made of transparent plastic to reveal their content better and in such a way that the space they occupy on the surface, once aligned on the module indicated with reference numeral 3 in the FIGURE, is as small as possible.

These containers 2 shall preferably have a configuration such that they narrow off at the bottom to a size that only lets the parts through one by one so that they can be applied to form a column.

To achieve this effect, each container 2 is to be fitted with a device which, when a blockage occurs and is detected, for example, by photoelectric sensor that detects the absence of parts at a certain height in the final column, causes the activation of a device that removes the top parts to unblock the whole and continues the formation of the column without interruptions. The bottom end of this final section is blocked, but has a lateral opening through which the part can come out when it is pushed by an appropriate mechanism at the right time. In an example, this push can be provided by electromagnets 10 associated to each of the containers, respectively, which, when they receive the necessary instruction from the computer, move one single part and make it fall on to a conveyor belt, represented in the drawing by reference numeral 4, to immediately return to the initial position and await another similar order.

The part expelled from the corresponding column travels along the conveyor belt 4, whose width is limited by guides such that only one part can fit, to the end of the route, where it comes up against an obstacle 5. From this position, it cannot continue to move and remains in said position so that the conveyor belt 4 slides under the part.

Following the aforementioned program sequence, the computer issues the instructions to push the next part from the column of container 2 that corresponds between the first and the last (in this example, column 16), according to the color of the pixel that is to be supplied at that time.

These orders are sequential, sufficiently spaced in time so that each part, traveling along the conveyor belt 4 is ordered until it reaches the stop 5, where they are grouped together when those which arrive come up against those which have already been retained in their corresponding position, forming a line in which the parts of the required covers are alternated.

Once a complete line has been formed, whose length can be previously calculated exactly, a relay (not referenced) or another connection element activates a high-precision linear displacement device, according to the direction indicated by the arrows shown on the FIGURE and referenced as f1 so that by means of a base 6 of a length at least equal to that of the line of parts and which forms the final section of one of the guides on the conveyor belt 4, moves laterally along the entire line to the outside edge of the belt 4, led by lateral guides that have been indicated on the drawing with reference numeral 8 on a glass support surface 7 which occupies part of the module and which constitutes the base on which, at the end of the process, the finished mosaic is placed. The first displaced line reaches a stop element 9 situated at the end of the sweep for said line, against which it is adjusted, and once the process for the formation of the first line has finished, that of the second line begins, which shall be displaced in the direction of the arrows f1 against the first line already in position, and so on, mounting one line against the other until the image is completed.

When pushed laterally towards the outside edge of the conveyor belt 4, each line is displaced by the linear displacement device 6 to a distance that is reduced by a quantity equivalent to the lateral dimension of the glass pixel, so that it is next to the previous line but does not push against it. When the last line is completed, the mosaic is an exact reproduction of the base image.

It is possible to introduce various control elements into the process to improve the performance or provide greater safety. For example, there can be a photoelectric sensor that issues a signal each time the motor of the conveyor belt 4 completes one revolution. In this way, the computer calculates the displacement speed of the belt 4 and, before putting a part from a certain column on any of the containers 2, it makes sure that the previous part has passed the point at which it is to exit.

Other sensors, fitted next to the conveyor belt 4, can be used to detect the permanent interruption of a beam, which would indicate that there is an obstruction further ahead and would stop the process. There are many control elements that can be added and, bearing in mind that the entire process is guided by a computer program specifically designed for this application, it is very simple to vary the conditions for the execution of each action.

Once the glass parts or pixels have been deposited on the glass support, perfectly in order according to the reproduced image, it is only necessary to stick the parts together and to the support so that the image remains in order and cannot be broken up. This effect can be achieved in two different ways, i.e. using an adhesive material or by heating in an oven.

The adhesion process can be carried out in a variety of ways. In any case, the ideal adhesive is of a polymerisable type, known on the market, which has the characteristic of remaining very fluid for many hours until it is illuminated by ultraviolet rays, after which it hardens very quickly with a very strong force of cohesion.

The use of this type of an adhesive would enable the preparation of the adhesion operation during the process so that moments before operating the motor that causes the lateral displacement of the line of pixels in the direction of the arrows f1, another device can be activated on a set of dispensers, producing the discharge of a small amount of adhesive on the glass surface where the line is to be situated.

When the line of parts reaches this place, they are all impregnated by the adhesive, both on the surface that is in contact with the base crystal and the surface that is in contact with the previous line (due to the effect of sweeping through the adhesive).

Once the final line has been completed, the unit is fixed by pressing all the lines simultaneously against the base crystal and, at the same time, laterally, all the lines against each other, while, under the entire unit, a source of ultraviolet rays is turned on to harden the adhesive immediately.

Another more simple option and one that renders the use of additional mechanisms unnecessary consists of waiting until the mosaic is completely formed, without dispensing adhesive during the process and then applying adhesive to the top of the mosaic, placing the support glass on top and projecting the ultraviolet light from above. In this case, the computer program that transmits the orders alters their sequence, in which case the image will be observed from what, in the other case, would be the rear, mirroring the base image.

In addition, the operation for sticking the parts together and/or to the support by means of heating is in itself the simplest and most effective process, although it requires an appropriate oven. Consequently, once all the parts that make up the mosaic have been positioned on the glass, the glass support is introduced into an oven appropriate for this type of method and heated up to the temperature at which the glass is softened but not melted during the time necessary for the parts to stick to each other and to the base glass to form a compact unit.

For the sake of manageability, it may not be appropriate to create mosaics with a surface area that is excessively large. Therefore, should the aim be to reproduce an image whose surface area exceeds what may be considered prudent, it can be separated into as many panels as necessary, which can then be put together later in the place where it is to be displayed.

The above has described a preferred embodiment in which a number of features and parameters have been described for the practical implementation of the method of the invention, and for the implementation of the device through which it is possible to carry out the effective implementation of the method. With regard to said device, mention has been made of the use, in the form described above, of both a device for eliminating the possible blockages that may occur as the parts fall from each container to the output column and the means used to dispense each colored part or pixel from the corresponding container 2 to a belt 4, according to the sequential order established for the formation of each row inside the module 7.

With regard to the unblocking devices associated with each dispenser 2, although they have not been described explicitly, in the preferred embodiment that has just been explained, they could consist of swivel arms associated with electric motors that would start up when the corresponding sensors detect an obstruction, in such a way that the swivel arm makes a movement that is partially developed inside the down column from the corresponding container, moving and eliminating the parts that have caused the blockage, and so that, should the problem not be solved with one single pass, the arm begins a second cycle until the blockage is removed. For its part, the devices that dispense the parts onto the belt 4 in this preferential implementation have been described as electromagnets 10 that receive electrical impulses at the appropriate time for the displacement of their rods or nuclei, pushing the part at the bottom of the column with which they are associated.

However, this form of implementation cannot be considered limiting, since the market offers many means that could be used to carry out the same function without the need for altering any of the steps of the process. For example, a second preferred embodiment could replace the electromagnets 10 with pneumatically operated elements, for example pneumatic cylinders whose rods are subjected to a tilting movement similar to that generated by the nuclei of the electromagnets, in such a way that the second case under consideration can include sensors associated with the end of the rod of each cylinder in order to determine the type of sweep carried out or to know whether or not the sweep has been productive and has dragged a part to the desired position or if it has failed as a result of, for example, there not being a part on the conveyor belt 4.

In addition, in this second embodiment, the provision of pneumatic means will enable the replacement of the elements for the elimination of blockages in the different part down columns from each container 2, since it shall suffice to have an opening on each column at the height at which the blockage normally takes place and for a blast of compressed air to be given when a blockage has been detected to move the parts and eliminate the blockage.

It is not considered necessary to give further details of this description to those skilled in the art to understand its scope and the advantages resulting from the invention, or to develop and implement the purpose thereof.

However, it must be understood that the invention has been described according to a preferred embodiment thereof, which means that it may be susceptible to modification without this representing whatsoever alteration to the functioning of said invention, where said modifications may particularly affect the steps of the process or the form, size and/or materials with which the device as a whole or each part thereof is manufactured.

The invention claimed is:

1. A method for the reproduction of images using glass, plastic or ceramic pixels, where the initial image is obtained from a photograph taken with a digital camera or scanned using an appropriate device, the image being composed of a number of individual colored pixels of a general cubic shape, the method comprising the following operations:

a) in a preliminary operation, applying to the digitalized image a software program that makes it possible to cut, retouch and modify the photograph until it can be separated into an appropriate number of pixels and which provides for the optimization of the color data to reduce the number of colors below a certain value, and the storing of said information to constitute a base imager;

b) preparing a database with the above information so that the identification of the color and the position of each pixel that makes up the base image are established, where all this information is stored in a file that can be subsequently read, ordered by rows and columns in the same order in which they are to be extracted later;

c) generating and transmitting instructions from the computer that contains the operative programs to the devices responsible for supplying the colored pixels;

in which said method further includes:

d) supplying each colored pixel in order for the successive formation of each row of pixels that are to make up the image, for which purpose the pixels are expelled from the corresponding column and sequentially fed onto a conveyor belt for being transported such that at the end of the travel they come up against a stop and from this position they cannot continue to move and remain in said position and the conveyor belt slides relative to the pixels with the pixels arranged against each other and against said stop in order in the final positions that correspond to them in accordance with the row being formed;

e) once each row of pixels has been formed by the supply of one pixel after another, displacing the complete row to the position it occupies in the image being formed, in a final position adjacent to the last row moved, where all the rows are positioned on a support; and f) once the image has been completed by the accumulation of successive rows on the support, effecting a final binding-together of the pixels that make up the image on said support and/or to each other.

2. A method according to claim 1, wherein the lateral dimension of the cubic part that makes up each of the pixels is equal to or less than 10 mm.

3. A method as claimed in claim 1, wherein both the pixels and the support element are made of a material selected from glass, plastic or ceramic.

4. A method as claimed in claim 1, wherein the binding-together of the pixels that make up the image is carried out through an adhesion process which includes an adhesion of the pixels to the support.

5. A method as claimed in claim 4, wherein the pixels are stuck in place using liquid adhesive activated by ultraviolet light.

6. A method as claimed in claim 1, wherein the binding-together of the pixels that make up the image to each other includes heating in an oven, subjecting the unit to an increase in temperature until the material is softened.

7. A device for the reproduction of images using glass pixels comprising:

a computer that contains specific application programs for the creation of a database containing information of a color and position of each pixel that makes up an image and for generating and transmitting instructions to devices for supplying the pixels;

a set of containers that hold the pixels, where each such container is used to contain pixels of one single color and configured so that the bottom part of each container has a cavity for the constitution of a column of pixels superimposed one on the other;

an actuator to push the pixel at the bottom of the column associated with the corresponding container out of said column;

a conveyor belt positioned to receive the pixels pushed sequentially by the actuator and transport them to the interior of a reception module such that at the end of the travel the pixels come up against a stop and from this position they cannot continue to move and remain in said position and the conveyor belt slides relative to the pixels, with the pixels arranged against each other and against said stop in order in the final positions that correspond to them in accordance with the row being formed;

a device for displacing the formed row, once completed, consisting of a base of substantially the same length as the row, enabled to displace the row to the position it occupies in the image that is being formed, whether or not in contact with a final stop if it is the first one or against the previous row if it is not the first one, where said rows are situated on the support on which the image is to be formed;

an unblocking device to remove possible blockages that may form in the columns of each container; and a sensor to detect the completion of one or more of the various operations.

8. A device as claimed in claim 7, wherein the actuator comprises one or more electromagnets that can be powered electrically according to the corresponding sequential order.

9. A device as claimed in claim 7, wherein the actuator comprises one or more pneumatic operation devices, including pneumatic cylinders with rods that move to push the pixels according to the corresponding sequential order.

10. A device, for the reproduction of images using glass, ceramic or plastic pixels, comprising:

a computer that contains specific application programs for the creation of a database containing information of a color and position of each pixel that makes up an image and for generating and transmitting instructions to devices for supplying the pixels;

a set of containers that hold the pixels, where each such container is used to contain pixels of one single color and configured so that the bottom part of each container has a cavity for the constitution of a column of pixels superimposed one on the other;

an actuator to push the pixel at the bottom of the column associated with the corresponding container out of said column;

a conveyor belt positioned to receive the pixels pushed sequentially by the actuator and transport them to the interior of a reception module such that at the end of the travel the pixels come up against a stop and from this position they cannot continue to move and remain in said position and the conveyor belt slides relative to the pixels, with the pixels arranged against each other and against said stop in order in the final positions that correspond to them in accordance with the row being formed;

a device for displacing the formed row, once completed, consisting of a base of substantially the same length as the row, enabled to displace the row to the position it occupies in the image that is being formed, whether or not in contact with a final stop if it is the first one or against the previous row if it is not the first one, where said rows are situated on the support on which the image is to be formed;

an unblocking device to remove possible blockages that may form in the columns of each container; and a sensor to detect the completion of one or more of the various operations, wherein the unblocking device incorporates a swivel arm whose sweep is developed according to a trajectory comprising the usual area in which the agglomeration or blockage of the pixels occurs in the column from the corresponding container.

11. A device, for the reproduction of images using glass pixels comprising:

a computer that contains specific application programs for the creation of a database containing information of a color and position of each pixel that makes up an image and for generating and transmitting instructions to devices for supplying the pixels;

a set of containers that hold the pixels, where each such container is used to contain pixels of one single color and configured so that the bottom part of each container has a cavity for the constitution of a column of pixels superimposed one on the other;

an actuator to push the pixel at the bottom of the column associated with the corresponding container out of said column;

a conveyor belt positioned to receive the pixels pushed sequentially by the actuator and transport them to the interior of a reception module such that at the end of the travel the pixels come up against a stop and from this position they cannot continue to move and remain in said position and the conveyor belt slides relative to the pixels, with the pixels arranged against each other and against said stop in order in the final positions that correspond to them in accordance with the row being formed;

a device for displacing the formed row, once completed, consisting of a base of substantially the same length as the row, enabled to displace the row to the position it occupies in the image that is being formed, whether or not in contact with a final stop if it is the first one or against the previous row if it is not the first one, where said rows are situated on the support on which the image is to be formed;

an unblocking device to remove possible blockages that may form in the columns of each container; and a sensor to detect the completion of one or more of the various operations wherein the unblocking device includes an outlet ready to give a blast of compressed air through an opening in the column of the pixels on each container in a position opposite the usual area in which the agglomeration or blockage of the pixels occurs.

* * * * *